(12) United States Patent
Bokämper et al.

(10) Patent No.: US 6,614,199 B1
(45) Date of Patent: Sep. 2, 2003

(54) DEVICE FOR DISPLACING FURNITURE

(75) Inventors: Ralf Bokämper, Lübbecke (DE);
Friedhelm Herzig, Bad Oeynhausen (DE); Martin Ctvrtnicek, Bünde (DE); Klaus Wehmeyer, Herford (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/786,576

(22) PCT Filed: Sep. 7, 1999

(86) PCT No.: PCT/EP99/06562

§ 371 (c)(1),
(2), (4) Date: Mar. 5, 2001

(87) PCT Pub. No.: WO00/13554

PCT Pub. Date: Mar. 16, 2000

(30) Foreign Application Priority Data

Sep. 7, 1998 (DE) ..................... 298 16 022 U

(51) Int. Cl.⁷ .................... G05B 5/00; H02H 7/08; H02P 1/00; H02P 3/00; H02P 7/00

(52) U.S. Cl. ............... 318/445; 318/806; 361/160; 361/170; 307/116; 307/140

(58) Field of Search ............... 318/445, 450, 318/454, 459, 460, 484, 489, 782, 806, 812, 813; 361/160, 170, 171, 172, 173; 307/116, 140, 141, 17, 38, 39, 134, 135, 139, 154, 80, 85, 86; 5/600, 616

(56) References Cited

U.S. PATENT DOCUMENTS

| | | | | |
|---|---|---|---|---|
| 3,965,396 A | * | 6/1976 | Tyler et al. | 361/106 |
| 4,000,450 A | * | 12/1976 | Nurnberg | 318/484 |
| 4,617,501 A | * | 10/1986 | Smith | 318/813 |
| 4,999,730 A | * | 3/1991 | Pickard | 340/662 |
| 5,486,973 A | * | 1/1996 | Meur | 361/170 |
| 5,528,449 A | * | 6/1996 | Koch | 307/116 |
| 5,905,354 A | * | 5/1999 | Futsuhara et al. | 318/799 |
| 5,939,803 A | * | 8/1999 | Frost | 307/38 |
| 6,100,607 A | * | 8/2000 | Olivieri et al. | 307/116 |

FOREIGN PATENT DOCUMENTS

| | | | |
|---|---|---|---|
| DE | 21 05 570 | 8/1971 | |
| DE | 91 16 509 U | 12/1992 | |
| DE | 43 15 210 C2 | 11/1994 | |
| DE | 44 00 657 C | 3/1995 | |
| EP | 0 615 667 B1 | 7/1995 | |
| JP | 01137526 A | * 5/1989 | H01H/9/56 |

* cited by examiner

Primary Examiner—Robert E. Nappi
Assistant Examiner—Edgardo San Martin
(74) Attorney, Agent, or Firm—Henry M. Feiereisen

(57) ABSTRACT

An adjustment device for adjusting an article of furniture, includes a drive unit having at least one direct current positioning motor connected to a mains power source; a control unit with at least one switching device for actuating the positioning motor(s); and a mains disconnect relay connected to a mains power plug assembly or a supply line connecting the voltage source to the mains. An additional switching unit which is separate from the switching device(s) for actuating the positioning motor(s) is provided for actuating the mains disconnect relay.

15 Claims, 7 Drawing Sheets

DEVICE FOR DISPLACING FURNITURE

BACKGROUND OF THE INVENTION

The invention relates to a device for adjusting an article of furniture, which includes the following: at least one drive assembly having a DC positioning motor, which is connected to a mains power source; a control unit with switching means operating the at least one positioning motor; and a mains-disconnect relay connected in series with a plug assembly or a supply line connected to the mains power source.

Adjustment devices for adjusting an article of furniture of the afore-described type are disclosed, for example, in EP 0 615 667 B. The mains power of the adjustment device described in this reference is disconnected according to the operating principle disclosed in DE 21 05 570 and has proven to be effective in practice. The device, however, could benefit from improvements relating to the following effect. Since a single pushbutton switch is used to operate the mains-disconnect relay as well as a relay for controlling the positioning motor, i.e., two switching operations are activated by a single pushbutton switch, there exists the risk that when the pushbutton switch is pressed accidentally—for example when the control unit is activated unintentionally during sleep—the article of furniture can be moved unintentionally. This situation must be reliably prevented—for example, when adjustments are made on hospital beds. When the switching assembly is designed as a pushbutton switch, operating the positioning motors becomes particularly simple. However, since the pushbutton switch can easily be activated unintentionally, the problem may arise that the mains power is also unintentionally applied.

It would therefore be desirable to provide an adjustment device for an article of furniture that eliminates the afore-described disadvantages and simultaneously improves the safety of the device.

SUMMARY OF THE INVENTION

According to one aspect of the invention, a simple switching means, which is separate from the switching means (or switching assembly) of the control unit for actuating the at least one positioning motor, is provided for operating the mains-disconnect relay, so that the article of furniture cannot be adjusted and/or the mains cannot be activated by operating a pushbutton switch alone. Increasing the protection against unintentional adjustment has the additional advantage that a different approach can be taken for designing the control unit—typically a manual switch—in that the safety features do no longer depend on the geometrical design of the manual switch.

Preferably, the switching device for operating the relay and the switching device for operating the at least one positioning motor are completely separated from each other galvanically when the mains is disconnected. This embodiment of the invention has the advantage that the drive unit, i.e., the positioning motors, cannot apply a sudden undesirable high load on the voltage source that supplies the control voltage or the control current, respectively, to the control contact of the relay for disconnecting the mains. If as in conventional devices, an auxiliary voltage source is used to power the control inputs of the mains-disconnect relay, i.e., a voltage source which provides a DC voltage to the pushbutton switch for operating the control input of the mains-disconnect relay that operates the positioning motor relay even after the mains has been disconnected, a brief high current surge (e.g., 100 ms duration at 3 A) can occur when the voltage source is as proposed connected in parallel, with the high current surge caused by the current drain of the positioning motors. This undesirable effect continues until the mechanical mains-disconnect relay switches with a predetermined time delay; as a result, the auxiliary voltage source (e.g., a battery) can be discharged unexpectedly fast and/or the other circuit components can experience undesirable current surges which in extreme cases can cause a malfunction.

Separating the switch that disconnects the mains from the pushbutton switches that operate the positioning motors of the drive assembly has additional advantages. One of the advantages is that the power disconnect circuit can be operated differently from the circuit that activates the positioning motors. While operating the positioning motors with pushbutton switches is convenient and easy, the mains should be disconnected from the mains only once before and after activation of the drive unit, in particular an unintentional activation should be reliably prevented. This could be accomplished by using a switch other than a pushbutton switch for disconnecting from the mains, for example, a slider switch with two defined switch positions, thereby almost entirely preventing an accidental activation of the switch.

According to another preferred embodiment of the invention, an inclination sensor is used instead of a slider switch, wherein the inclination sensor disconnects the mains automatically when a predetermined inclination angle is exceeded, for example in a situation where the mains power disconnect is located in the manual operating unit. In this case, the mains can be automatically disconnected when the manually operated control unit is picked up. Advantageously, the activation/disconnect positions can be adjusted on the manually operated control unit by a mechanical adjustment in order to take into consideration the different customer-specific rest positions of the control unit.

Alternatively, the switching device for activating the relay can also include an acoustic sensor. The acoustic sensor—and/or a processing unit connected thereafter—can for example be designed so that the mains can be switched on in response to a sound signal which produces on the sensor a predetermined audio level. This type of switching on the mains can particularly benefit disabled persons; even more advantageously, a solution incorporating a speech sensor for enabling/disconnecting the mains can be combined with a method for controlling the adjustment device of an article of furniture by speech input, as disclosed in DE 43 15 210 C2. It may also be possible to activate in a simple manner, in this case by a speech command, several functions—i.e., enabling/disconnecting the mains and controlling the motor (the voice command causes, on one hand, the motor to be controlled and, on the other hand, the power mains to be connected), potentially even by using only a single command ("UP", "DOWN"). Other hand, when mains are to be disconnected, the voice command can also completely galvanically separate the circuit section "drive unit" from the switching section "power disconnect control."

Another advantageous embodiment of the invention employs a motion sensor as switching means for activating the relay—i.e., for disconnecting the mains. The mains can be disconnected by arranging the motion sensors in a suitable pattern, for example on a auxiliary table or, if desired, in a housing separate from the manual switch, and moving a hand past the sensor.

Alternatively, the switching device for operating the relay can also include a contact sensor, for example a sensor with a conductive plastic, or a capacitive contact sensor with a metal plate, whereby the electric field can be changed by placing a finger on the plate.

Advantageously, the control device for actuating the relay can also include a light-sensitive sensor. A light-sensitive sensor can be designed, for example, so that the mains is connected when the light level in a room exceeds the background illumination, for example, when a lamp is switched on or in daylight. In the dark, i.e., during sleep, the power mains remain disconnected.

The afore-described embodiments of the switch designs for disconnecting the mains—as described above—can be arranged in different locations of the circuit and the adjustment device. For example, for hospital beds, a patient could be allowed to operate the positioning motors, but may not be permitted to operate the power disconnect, for example, the patient's body may have to remain in a certain position during the night. In such situations, the switch for disconnecting the mains should advantageously be placed separate from the control unit, for example in the drive unit, the mains plug assembly, in the power cord or at another suitable location (see the detailed description of the FIGS.). This provides a suitable interlock device for applications in hospitals.

Additional advantageous embodiments of the invention are described in the dependent claims.

BRIEF DESCRIPTION OF THE DRAWING

Several embodiments of the invention will be described hereinafter with reference to the drawings.

DETAILED DESCRIPTION OF PREFERRED EMBODIMENTS

Figure 1A:
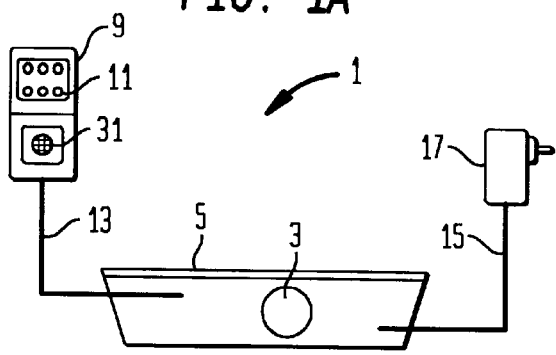
FIGS. 1 a–e show schematic views of different embodiments of the invention.
Figure 1B:
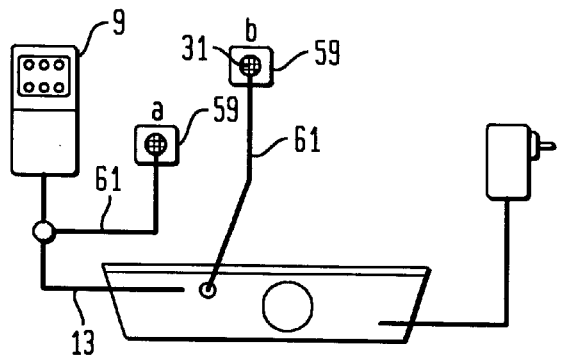
Figure 1C:
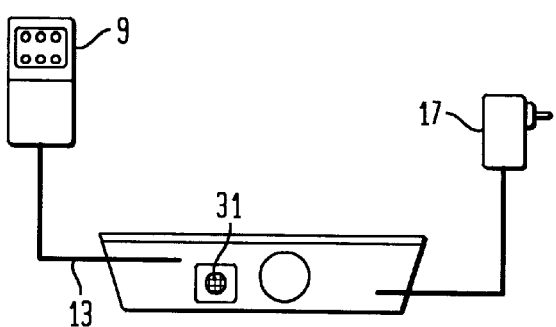
Figure 1D:
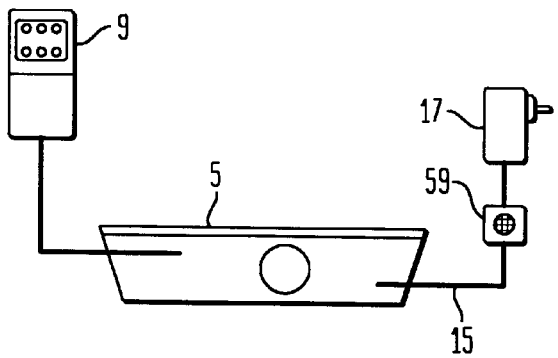
Figure 1E:
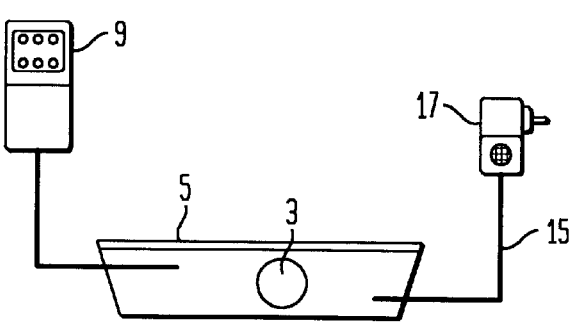
Figure 2:
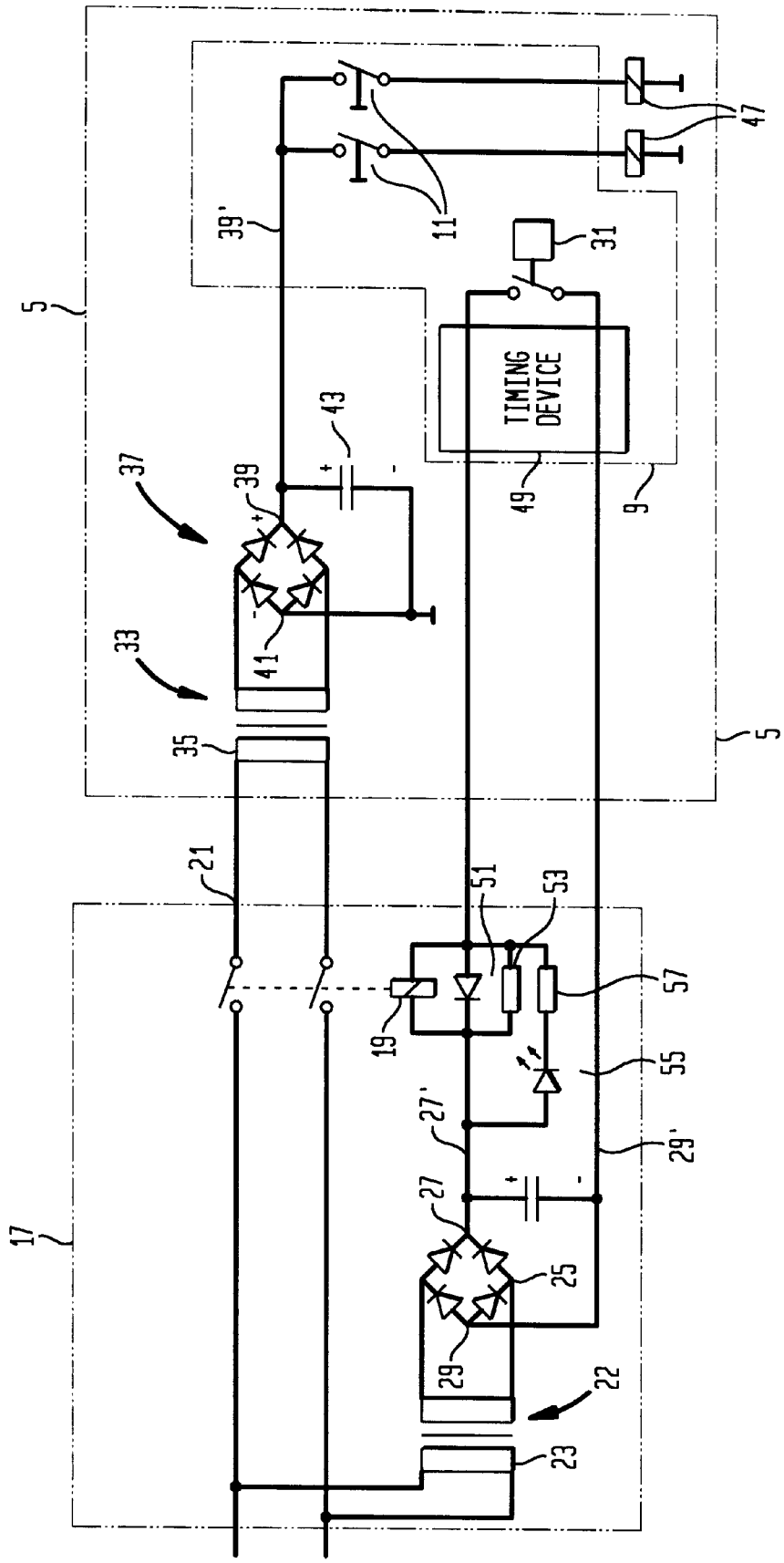
FIGS. 2–7 show simplified schematic circuit diagrams of different embodiments of the invention.

FIG. 1 together with FIG. 2 depicts the basic implementation of an adjustment device according to the invention. The adjustment device 1 for adjusting an article of furniture (not shown) includes a drive unit 5 with at least one—preferably, however, at least two—DC positioning motor(s) 3 (the section of the circuit indicated on the right-hand side of FIG. 2 by short dashed lines), with the motor(s) connected to a mains power source 33.

A control unit 9 with switching means—in the present example pushbutton switches 11—enables activation of the positioning motors 3. The control unit is implemented as a manual switch 9 that is connected to the drive unit via a multi-wire manual switch cord 13. The drive unit 5 is connected to a mains power plug 17 via a power supply line 15.

The mains power plug 17 includes a relay with two relay switch contacts for disconnecting the wires 21 carrying the AC mains voltage from the power mains. The control input of the relay 19 is controlled by a DC voltage which is produced by a voltage source 22 having a transformer 23 connected to a rectifier 25 which is then connected to the control input of the relay. From the (+) pole 27 and the (−) pole 29 of the rectifier 25, a wire 27' is connected to the relay 19, whereas a wire 29' is routed through the lines 13 and 15 to the switching device 31 in the manual switch 9 and back to the relay 19. With this arrangement, the circuit section for the mains power can be completely separated from the circuit section for activating the drive assembly 5 when the power is disconnected. There is also no longer a need for an auxiliary voltage source. In addition, the drive unit 5 does no longer produce an undesirable current surge when the switching device 31 is activated, i.e., the positioning motors 3 no longer represent a load for the control voltage of the mains-disconnect relay 19.

The two AC conductors 21 are routed through the power mains 15 to the drive unit 5 which includes the mains-powered DC voltage source 33 with a transformer 35 and a rectifier 37 connected thereto. A smoothing capacitor 43 is connected between the DC (+) pole 39 and the (−) pole 41 (ground) on the output side of the rectifier. A wire 39' is connected between the (+) pole 39 and the pushbutton switches 11 which control, when closed, the respective control input of a motor relay 47 for actuating the positioning motors 3 (not shown in FIG. 2) which adjust the article of furniture.

A delay or timing circuit 49, respectively, located in the wires leading to the switching device 31 is indicated schematically by a functional block diagram. The timing circuit 49 disconnects the power mains only after a predetermined time period of, for example, several minutes has passed after activation of the switching device 31. This arrangement prevents that the power mains are accidentally disconnected after activation, before a sufficiently long time for operating the article of furniture has passed—for example when the switch 31 is implemented as an acoustic sensor or inclination sensor.

A diode 51 connected in parallel to the control input of relay 19 in the (+) line 27' helps to prevent current surges. A resistor 53 connected in parallel to the diode 51 indicates that an additional user can be connected (e.g., an optional IR interface). A light-emitting diode 55 connected in parallel to resistor 53 and in series with a resistor 57 is used to indicate the state, e.g. if the power mains are disconnected. The switching assembly can be implemented using the afore-described options, such as an inclination sensor, an acoustic sensor, a motion sensor, a contact sensor and/or a light-sensitive sensor.

Figure 3:
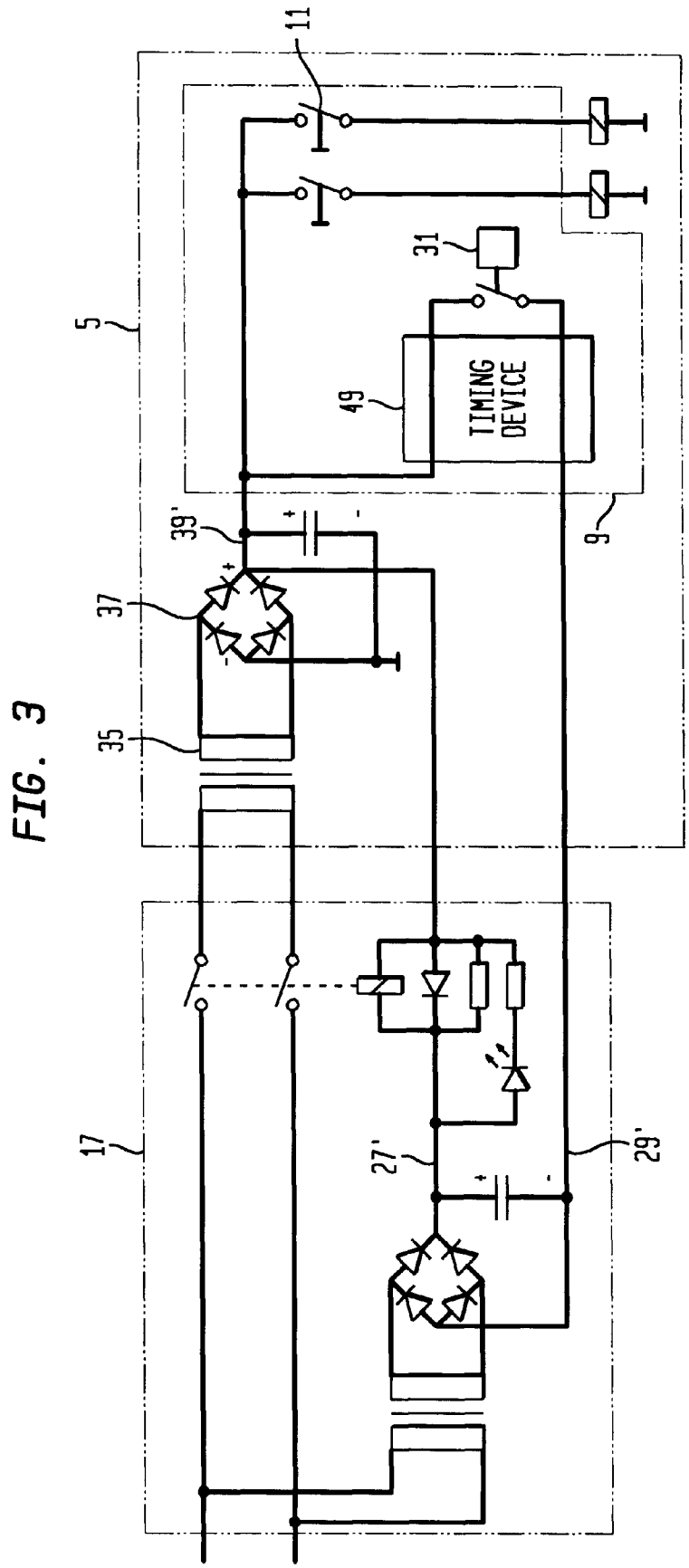

In the embodiment of FIG. 3, unlike the embodiment of FIG. 2, the wire 27' which runs from the switching device 31 back to the relay 19, is combined in the region of the manual switch cord 13 in a simplified manner with the (+) wire 39' that operates the pushbutton switch 11. In this way, one of the wires of the manual switch cord 13 can be eliminated. However, there is no longer the advantage of a complete galvanic separation when the power mains are disconnected. Advantageously, this embodiment of the invention can also prevent accidental activation.

Figure 4:
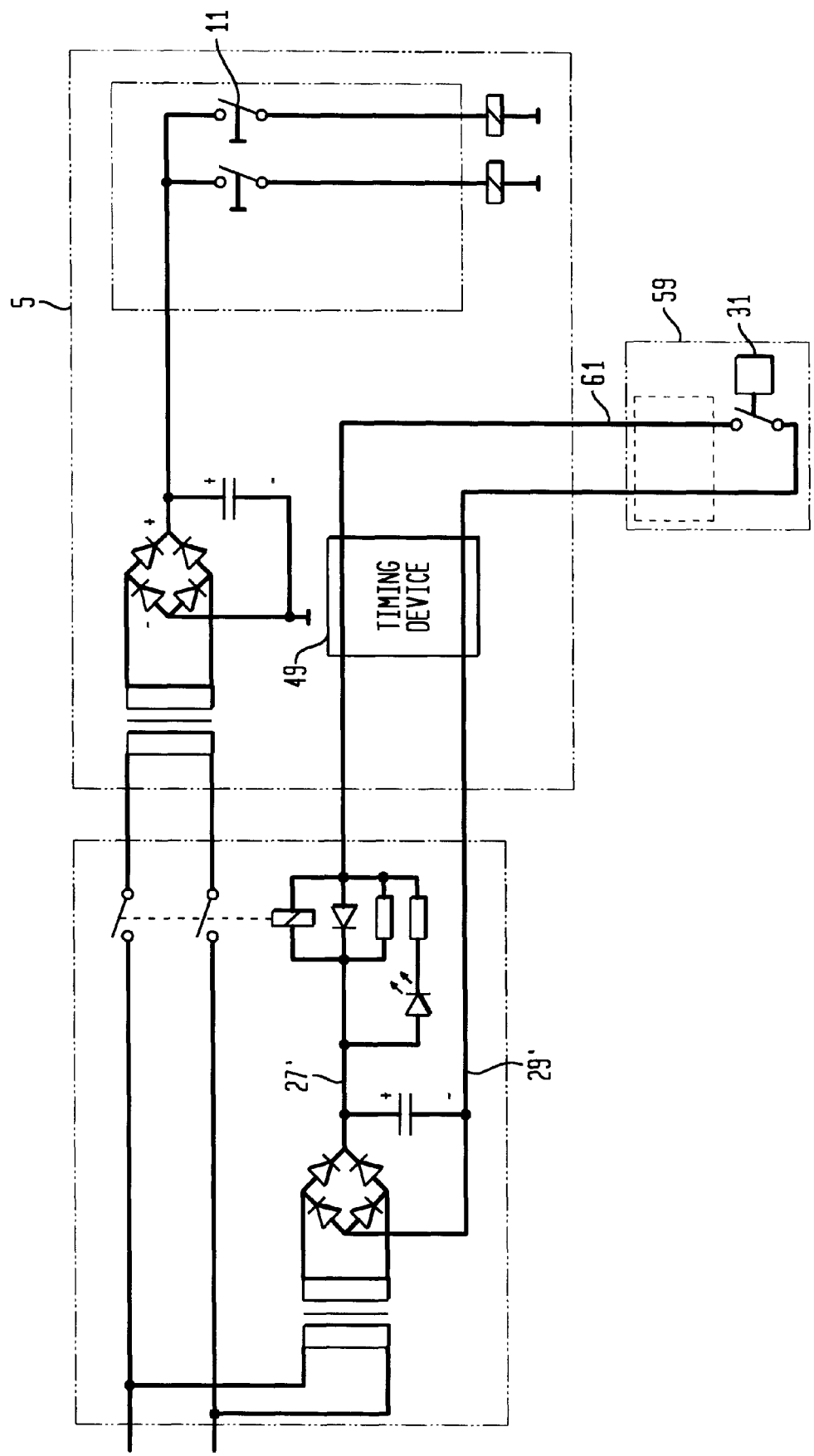

In the embodiment of FIG. 4, unlike the embodiment of FIG. 3, the switch 31 is routed from the drive unit to a separate housing and has its own housing supply line 61, which allows the designer to implement the manual switch 9 with many different design options, since the manual switch 9 does no longer have to rely on its geometric shape for protection against accidental activation of the pushbutton switch 11.

As seen in FIG. 1b, the embodiment of FIG. 4 can be implemented, for example, by having the housing supply line 61 branch off from the manual switch 13 or continue directly from the drive unit 5. Conversely, FIG. 1c depicts an embodiment where the switch 31 is integrated into the housing of the drive unit 5. The optional delay device can be installed in the housing 59 or integrated with the drive unit 5 or the plug assembly 17.

Figure 5:
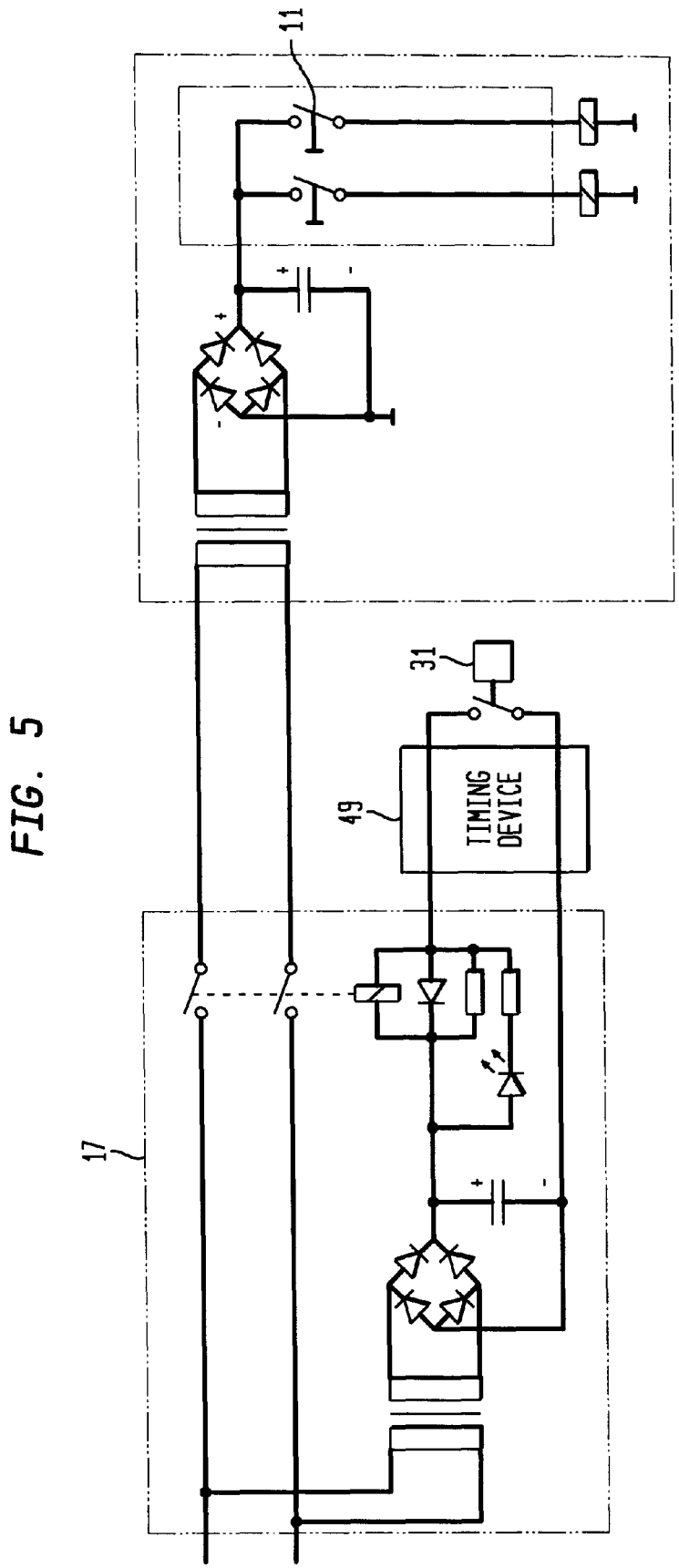
Figure 6:
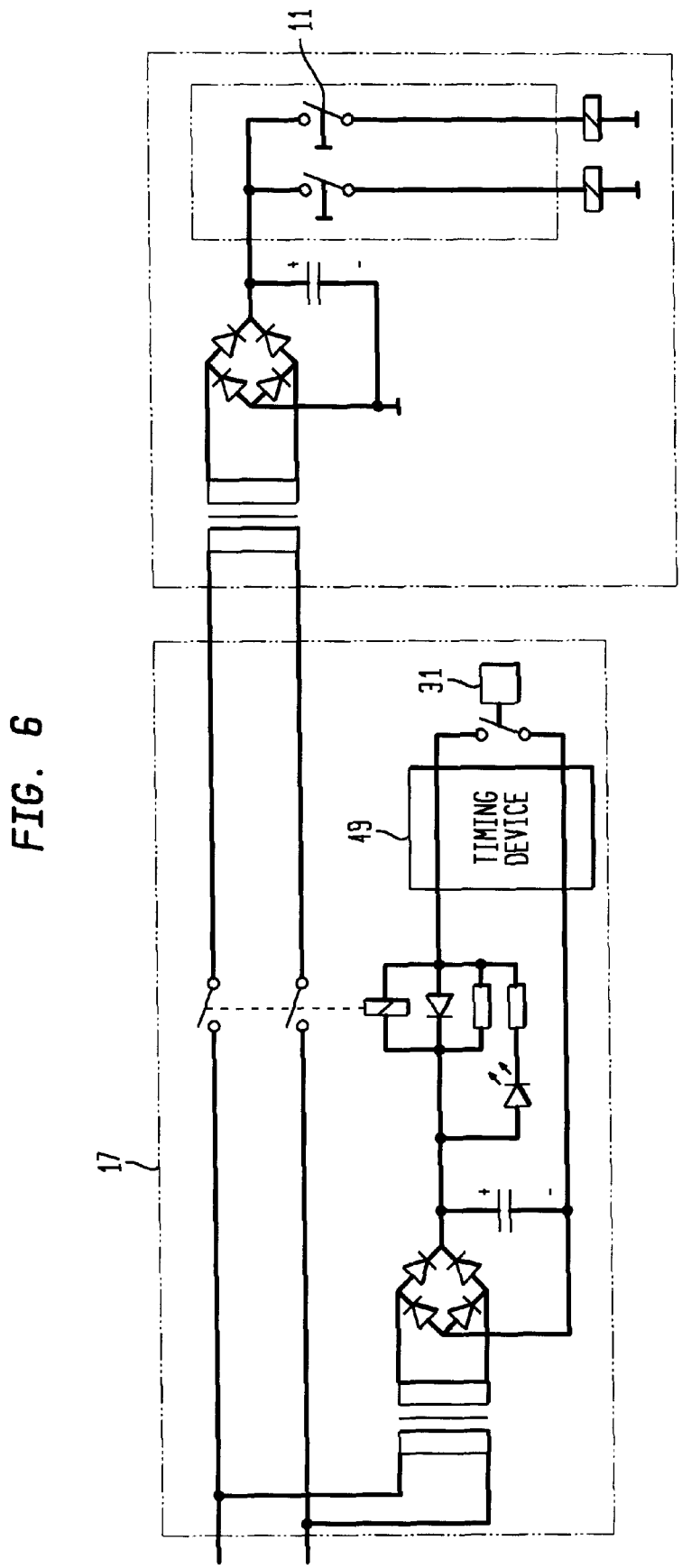

In additional embodiments, the housing 59 can be integrated into the power supply 15 between the power plug-in section 17 and the drive device 5' (FIG. 1d and FIG. 5); alternatively, the switch 31 can be integrated into the plug assembly 17 (FIG. 1e and FIG. 6). Advantageously, the embodiment of FIG. 5 employs a battery or a dynamo instead of the voltage source 22 for producing the DC control voltage (not shown). In this case, the circuit for disconnecting the power mains does no longer have to be electrically connected to the circuit that controls the motor. The only contact point between the two circuits is in this case the mains-disconnect relay, which of course, operates mechanically, so that the two circuits are no longer galvanically connected with each other.

Figure 7:
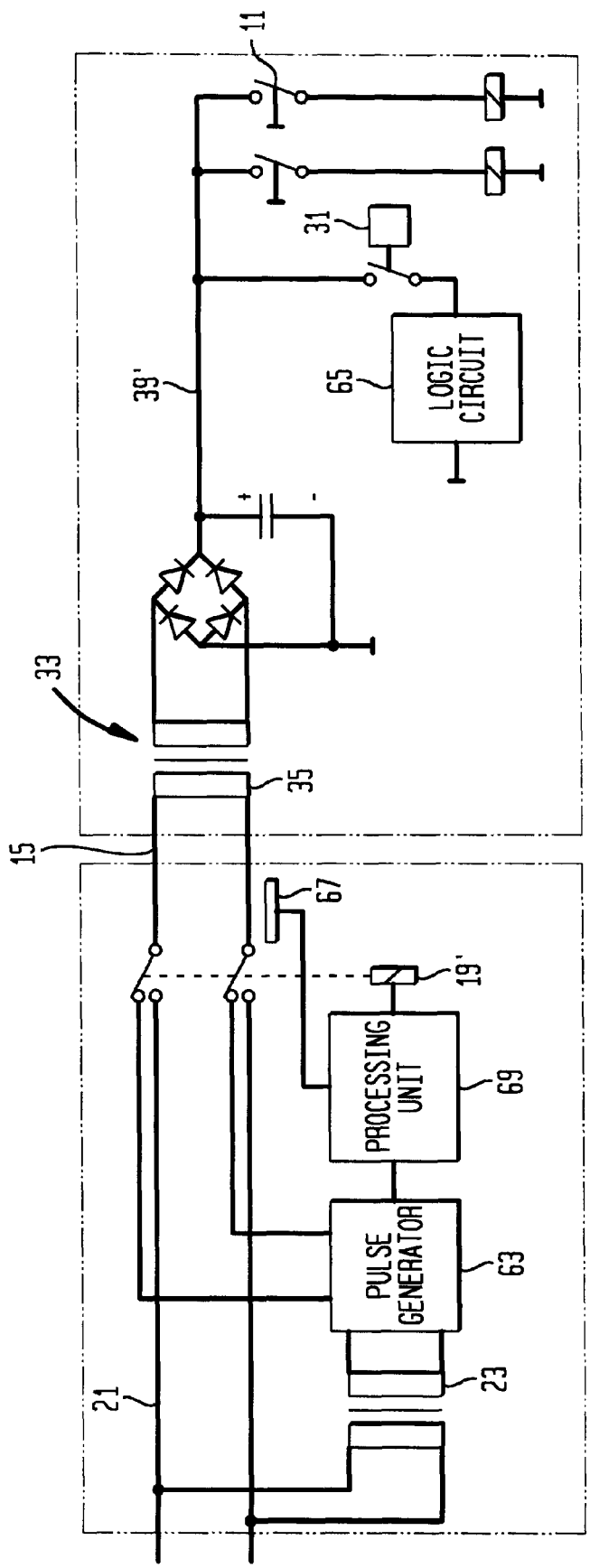

In the embodiment of FIG. 7—which can include all afore-described embodiments relating to the type and placement of the switching device 31—,the relay 19 is implemented as a double-throw contact relay 19'. In one of the two contact positions, the contacts of the double-throw relay 19' connect the main power source that supplies the positioning motors of the drive unit to the AC mains voltage and the supply lines 21 and, in the other switch position, with a device 63 that produces pulse signals, in particular HF signals.

The HF signals are transmitted via the power cord 15, the mains voltage source 33, and the (+) line 39', to which the switching device 31 is connected. When the switching device 31 is in the closed position, the HF signals are transmitted to a network 65 which causes the signal form in the power cord 15 to change. This change is detected by a sensor—e.g., a current sensor 67—in the wires leading to the plug assembly. A processing unit 69 compares the output of sensor 67 with stored limit values or—in a particular embodiment—with stored waveforms.

For this purpose, the processing unit is provided, for example, with a memory device and includes a processor, such as a DSP processor (digital signal processor), commercially available from many electronics firms. The signal sensor is preferably implemented as a current sensor, wherein the DSP processor is designed so as to compare the waveform patterns stored in the memory device with output signals received from the current sensor 67. Depending on this comparison, the control signal is connected to the input of relay 19' when the switch 31 is closed, and the power mains is also connected, for example for a predetermined time period of five minutes, whereafter the power mains can be automatically disconnected (in this case, a delay device can again be employed which can also be implemented in software if a process controller is used).

Optionally, the power mains can also be connected and disconnected in response to the output signal of the current sensor. For example, after the positioning motor is actuated, the DSP processor can activate a relay based on changes in the current signal when the positioning motor turns off.

What is claimed is:

1. An adjustment device for adjusting an article of furniture, the adjustment device comprising:
    a first voltage source connected to a power mains,
    a drive unit associated with the first voltage source and including at least one DC positioning motor;
    a control unit having at least one switching device for operating the at least one positioning motor;
    a mains-disconnect relay implemented as a double-throw contact relay having contacts with two switch positions, wherein the contacts in one of the two switch positions connect a voltage source that supplies the positioning motors of the drive unit to the AC mains voltage, and in the other switch position to a device that generates pulse signals, said mains-disconnect relay connected to a plug assembly or to a supply line of the voltage source,
    a switching means for actuating the mains-disconnect relay, wherein the switching means is separate from the at least one switching device of the control unit and is integrated with the control unit or with the supply line connected to the control unit,
    a network, connected to the switching means that actuates the double-throw contact relay, for processing the pulse signals that are produced in response to an actuation of the switching means,
    a signal sensor arranged on the power mains between the double-throw contact relay and the switching means and providing an output signal, and
    a processing unit connected to an output of the signal sensor for actuating the double-throw contact relay in response to the output signal of the signal sensor.

2. The adjustment device of claim 1, wherein the switching means that actuates the mains-disconnect relay and the switching device that operates the at least one positioning motor are completely separated from one another galvanically in a state of disconnection from the power mains.

3. The adjustment device of claim 1, wherein the switching means that actuates the mains-disconnect relay is connected before a control input of the mains-disconnect relay.

4. The adjustment device of claim 1, and further comprising a second voltage source for producing a control voltage for actuating the mains-disconnect relay, with the second voltage source converting an AC mains voltage tapped at the relay contacts into a DC control voltage.

5. The adjustment device of claim 1, wherein the switching means that activates the mains-disconnect relay includes an inclination sensor.

6. The adjustment device of claim 1, wherein the switching means that activates the mains-disconnect relay includes an acoustic sensor.

7. The adjustment device of claim 1, wherein the switching means that activates the mains-disconnect relay includes a motion sensor.

8. The adjustment device of claim 1, wherein the switching means that activates the mains-disconnect relay includes a light-sensitive sensor.

9. The adjustment device of claim 1, wherein the switching means that activates the mains-disconnect relay includes a contact sensor.

10. The adjustment device according to claim 1, wherein the switching device for actuating the mains-disconnect relay includes a timing device for providing a switching delay after an activation of the switching means.

11. The adjustment device of claim 1, wherein the processing unit for actuating the double-throw contact relay includes a memory device and a processor.

12. The adjustment device of claim 11, wherein the processor is a DSP processor.

13. The adjustment device of claim 12, wherein the signal sensor is implemented as a current sensor and at least one predefined waveform pattern is stored in the memory device, and wherein the DSP processor is designed to compare the at least one predefined waveform pattern with the output signal of the current sensor and to output a control signal depending on this comparison.

14. The adjustment device according to claim 4, wherein the second voltage source is implemented as a battery or a dynamo.

15. The adjustment device of claim 14, wherein the dynamo is implemented as a manually operated dynamo.

* * * * *